United States Patent [19]
LeMay et al.

[11] Patent Number: 5,531,311
[45] Date of Patent: Jul. 2, 1996

[54] CONVEYOR ARTICLE PROPELLING ROLLER DRIVE SYSTEM

[75] Inventors: Curtis E. LeMay, Shelbyville; Bernard H. Woltjer, Jenison; David H. Cotter, Coopersville, all of Mich.

[73] Assignee: Rapistan Demag Corporation, Grand Rapids, Mich.

[21] Appl. No.: 354,591

[22] Filed: Dec. 13, 1994

Related U.S. Application Data

[62] Division of Ser. No. 37,035, Mar. 25, 1993, Pat. No. 5,415,281.

[51] Int. Cl.⁶ .................................................. B65G 47/12
[52] U.S. Cl. .......................... 198/448; 198/786; 198/790
[58] Field of Search .................................. 198/789, 790, 198/791, 781.03, 781.04, 781.07, 781.11, 448, 443, 452, 453, 786

[56] References Cited

U.S. PATENT DOCUMENTS

| | | |
|---|---|---|
| 1,192,832 | 7/1916 | Sherman . |
| 1,292,178 | 1/1919 | Waterman . |
| 1,321,303 | 11/1919 | Haldeman . |
| 1,487,000 | 3/1924 | Williams . |
| 1,883,889 | 10/1932 | Farley . |
| 1,929,707 | 10/1933 | Mojonnier . |
| 2,190,418 | 2/1940 | Davidson et al. . |
| 2,566,417 | 9/1951 | Holm . |
| 2,586,523 | 2/1952 | Dudley, Jr. . |
| 2,706,034 | 4/1955 | Russell et al. . |
| 2,848,096 | 8/1958 | Luginbühl . |
| 3,240,311 | 3/1966 | Hofer et al. . |
| 3,241,651 | 3/1966 | Colby . |
| 3,255,865 | 6/1966 | Sullivan ............................ 198/781.03 |
| 3,451,527 | 6/1969 | Leach ............................ 198/781.04 X |
| 3,458,026 | 7/1969 | Lauzon et al. . |
| 3,485,339 | 12/1969 | Miller et al. . |
| 3,502,197 | 3/1970 | Kato et al. ........................ 198/781.03 |
| 3,508,642 | 4/1970 | Standley et al. . |
| 3,527,336 | 9/1970 | Johnston . |
| 3,580,379 | 5/1971 | Shuster et al. . |
| 3,601,240 | 8/1971 | Dominici . |
| 3,610,396 | 10/1971 | Babunovic . |
| 3,637,066 | 1/1972 | Idskov et al. . |
| 3,643,789 | 2/1972 | Werntz ................................. 198/790 |
| 3,666,077 | 5/1972 | Marshall . |
| 3,840,109 | 10/1974 | Kohl ..................................... 198/789 |
| 3,866,739 | 2/1975 | Sikorski . |
| 3,895,706 | 7/1975 | Levin et al. . |
| 3,973,672 | 10/1976 | Frost . |
| 4,039,074 | 8/1977 | Maxted . |
| 4,044,897 | 8/1977 | Maxted . |
| 4,054,199 | 10/1977 | Polderman . |
| 4,054,201 | 10/1977 | Rollinger . |
| 4,103,769 | 8/1978 | Jorgensen ......................... 198/789 X |
| 4,223,780 | 9/1980 | Saur .................................. 198/789 X |
| 4,264,002 | 4/1981 | Van Der Schie . |
| 4,284,186 | 8/1981 | Brouwer . |
| 4,301,914 | 11/1981 | Krammer ......................... 198/790 X |
| 4,372,441 | 2/1983 | Krammer ......................... 198/789 X |
| 4,489,820 | 12/1984 | Schneider . |
| 4,640,409 | 2/1987 | Holtman .......................... 198/789 X |
| 4,708,234 | 11/1987 | Born et al. . |
| 4,832,184 | 5/1989 | DeGood ........................... 198/789 X |
| 4,889,224 | 12/1989 | Denker . |
| 4,919,256 | 4/1990 | Gebhardt ......................... 198/790 X |
| 5,082,109 | 1/1992 | Blondeau ......................... 198/790 X |
| 5,101,958 | 4/1992 | LeMay et al. . |
| 5,147,023 | 9/1992 | Meindl . |
| 5,240,101 | 8/1993 | LeMay et al. . |
| 5,244,081 | 9/1983 | Kajii et al. ............................ 198/790 |
| 5,311,979 | 5/1994 | Risley et al. . |

FOREIGN PATENT DOCUMENTS

| | | |
|---|---|---|
| 2248216 | 5/1975 | France . |
| 519810 | 3/1931 | Germany . |
| 0203023 | 9/1986 | Japan . |

Primary Examiner—D. Glenn Dayoan
Attorney, Agent, or Firm—Van Dyke, Gardner, Linn & Burkhart

[57] ABSTRACT

An article unscrambler and aligner is disclosed which receives articles of different sizes in random order and position, and using plural side-by-side lanes each of which lanes has driven article transport rollers at different speeds, which speeds are uniform for the length of the lane, but are progressively higher in each lane toward one side of the unscrambler in order to provide a lateral linear speed increase. This speed increase causes separation and rotation of the articles and also causes them to arrange in single file along one side of the unscrambler's surface and so discharge them onto a conveyor at the end of the unscrambler remote from that at which the articles were received. One or more lanes are composed of rollers of tapered diameter in order to make the lateral speed increase more uniform.

18 Claims, 5 Drawing Sheets

CONVEYOR ARTICLE PROPELLING ROLLER DRIVE SYSTEM

This is a division of application Ser. No. 08/037,035, filed Mar. 25, 1993, which is now U.S. Pat. No. 5,415,281.

BACKGROUND OF THE INVENTION

This invention relates to conveyor systems and, in particular, to devices for use in such systems to unscramble articles received in random order and orient and align the articles in single file. This invention is especially useful with a very high volume of articles and is particularly adapted for use with parcel distribution centers.

Parcel distribution centers receive parcels, or articles, that are unloaded en masse from trucks or other transportation media. The parcels merge into a central area in a random order and orientation where they must be oriented and aligned in a single file for further processing. The further processing typically includes scanning of destination-identifying bar codes and sortation to destination areas for loading onto trucks or other transportation media.

Because parcel distribution systems must be capable of transporting parcels from any destination to any other destination within 24 hours, or less, the parcel distribution center must be capable of handling a large volume of packages in close pack order. The article unscrambler and aligner must be able to handle a large volume of parcels at a rate that is commensurate with very high speed conveyor equipment and do so with little or no incidence of damage to the articles and with minimal manual intervention.

SUMMARY OF THE INVENTION

The present invention is intended to provide the capability to unscramble randomly ordered and oriented articles very rapidly and arrange them in single file without damage to the articles or their contents and with a very high degree of accuracy. The invention is embodied in a high volume unscrambler and article aligner having a receiving portion to which articles are delivered in random order and alignment and a discharge portion from which unscrambled aligned articles are discharged. The unscrambler and article aligner has an article transport surface that is adapted to transport articles longitudinally from the receiving portion to the discharge portion. According to an aspect of the invention, the article transport surface produces a linear speed increase laterally toward the discharge portion in order to cause articles laterally proximate the discharge portion to move ahead of laterally adjacent articles. The linear speed increase additionally tends to create beneficial gaps between products to allow other articles to move into the gaps as well as a beneficial, non-uniform rotation of articles in order to separate the articles. The result is a very high speed operation that efficiently and effectively separates groups of articles all the while accelerating the articles as they move toward the discharge lane.

In one particular form, the linear speed increase is created by laterally tapered rollers in order to create a linearly increasing surface velocity laterally across the rollers. The tapered rollers are preferably arranged in lanes with each lane driven at a different rotational speed from adjacent lanes. An alignment belt is preferably provided along the transport surface in line with the discharge portion and driven at a velocity at least as great as that of an adjacent portion of the transport surface.

According to another aspect of the invention, a high volume unscrambler and aligner is provided in which the drive equipment is separately connected to each roller. Thus, should the drive for any particular one of the article transporting rollers fail, only that roller will be rendered inactive allowing the remainder of the equipment to continue to operate at full capacity. This is important in order to maintain the high volume required for parcel distribution centers of the type to which the present invention is especially adapted. Furthermore, any shutdown periods for the equipment must be of a short duration. This aspect of the invention allows any of the article transporting rollers, which have, for any reason, become inoperative during the preceding operating period, to be promptly repaired before the next operating period begins. Thus, the dependability and integrity of the entire system is enhanced.

The present invention facilitates a high volume unscrambling and aligning of parcels because of its effective means for separating the articles, providing gaps between the articles and aligning the articles in single file. The present invention does so in a more efficient manner than prior systems and, therefore, requires fewer packages that must receive special handling or recirculation.

These and other objects, advantages and features of this invention will become apparent upon review of the following specification in conjunction with the drawings.

DESCRIPTION OF THE PREFERRED EMBODIMENTS

Figure 1:
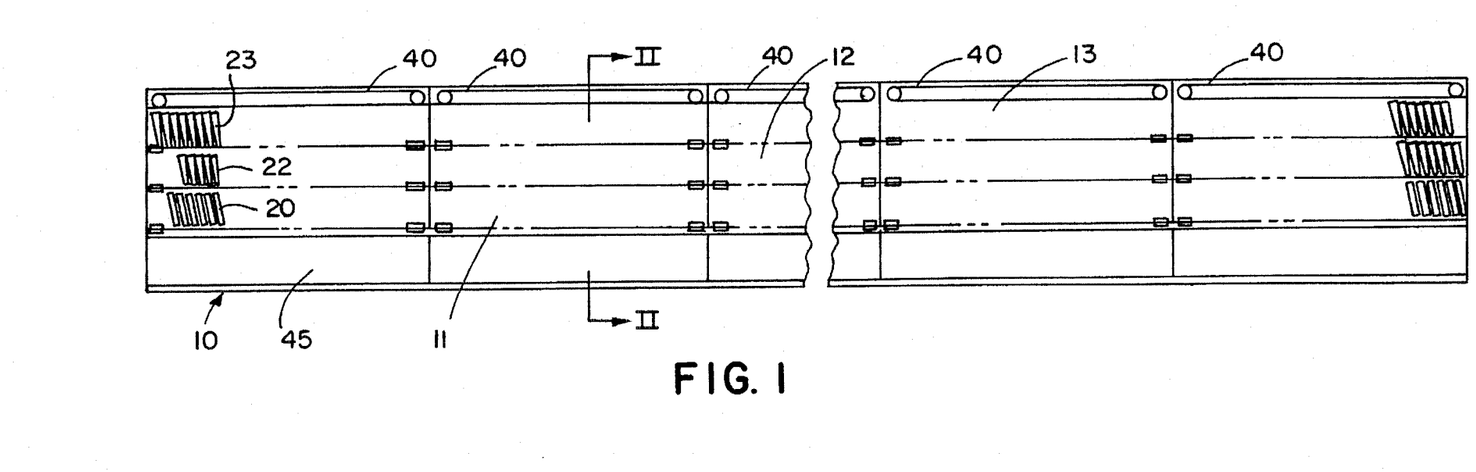
FIG. 1 is a schematic plan view of the unscrambler incorporating this invention.
Figure 1A:
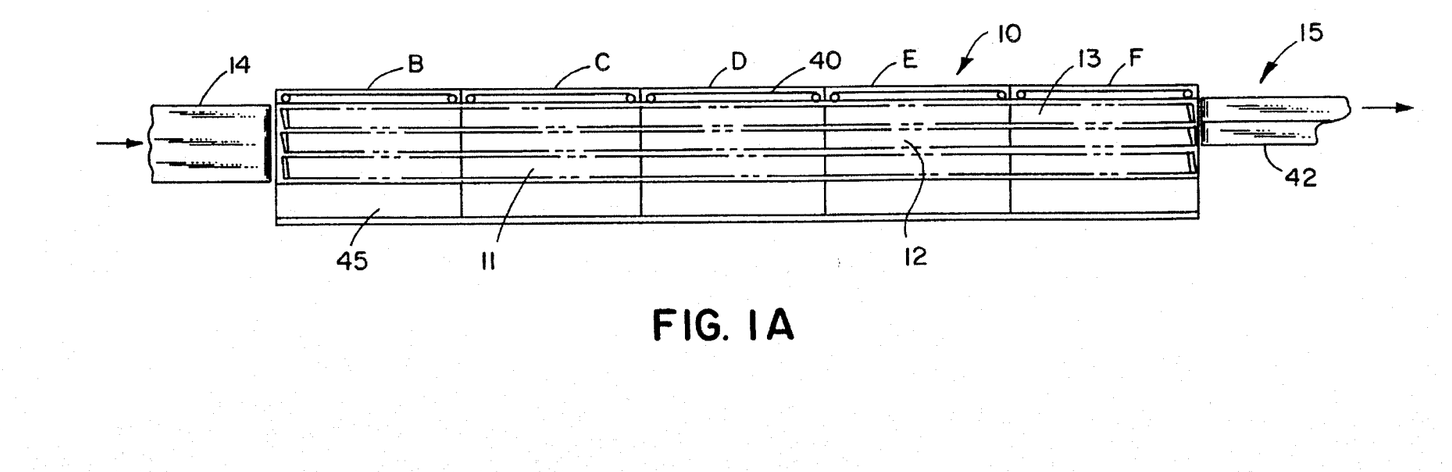
FIG. 1A is the same as FIG. 1 but on a reduced scale so that the input and output conveyors can be fragmentally illustrated.
Figure 2:
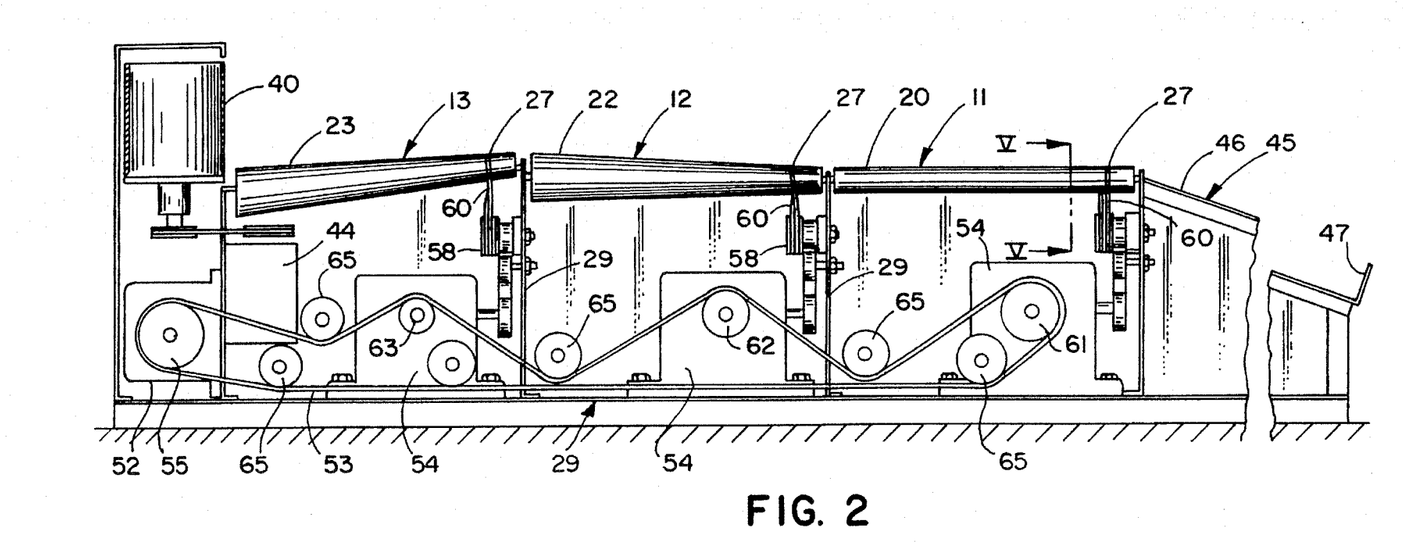
FIG. 2 is an enlarged, sectional elevation view taken along the plane II—II of FIG. 1.

Referring now specifically to the drawings, and the illustrative embodiments depicted therein, an article unscrambler and aligner 10 has three lanes, all of which can and do act as receiving lanes. These lanes include a slow speed lane 11, an intermediate speed lane 12 and a high speed, final alignment lane 13 (FIGS. 1 and 14). The articles or packages to be organized in alignment are delivered to all three lanes of the unscrambler 10 by an input conveyor means 14 in random order. The articles or packages are discharged from the unscrambler at the opposite end onto the output conveyor 15. As the articles pass through the unscrambler they are accelerated, moved laterally across the surface of the unscrambler and aligned, largely in single file, in the alignment lane 13 against or immediately adjacent the vertical belts 40 which form an upstanding vertical barrier preventing articles from being propelled laterally off the rollers forming the alignment lane 13. Referring to FIG. 2, each of the belts 40 is driven by a motor 44. It could also be driven by a prime mover 52 using a suitable gear or belt interconnection of conventional design.

When the unscrambler is being operated with a normal and reasonably uniform load, all of the articles will end up in the alignment lane 13 against the belt 40. However, articles of an unusual size or articles which do not manage to move transversely across to the unscrambler's surface and line up adjacent belt 40 in lane 13, for some reason, such as the unscrambler's capacity being temporarily unable to accommodate the number of articles passing through the equipment, may be caused to discharge onto an overflow relief tray 45 from the lane 11. The tray 45 has a surface 46 inclined downwardly away from the main bed of the unscrambler, preferably at an angle of about 20°. The inclined surface causes the articles, by gravity, to leave the main unscrambler surface and come to rest against the stop 47. These articles can be picked up and, at a suitable place and under suitable conditions, returned to the input conveyor 14 to pass through the unscrambler under more favorable operating circumstances.

The article transporting rollers 20, 22 and 23 of the lanes 11, 12 and 13 collectively form an article transport surface on which the articles are moved lengthwise and toward one side, that is the discharge side or lane 13 of the unscrambler, accelerated and aligned parallel to that one edge of the unscrambler. The construction of this surface has a preferred arrangement and several modifications, in part depending upon the result desired, the nature of the articles and the volume of articles involved. These will be explained in detail subsequently. Each of the rollers in each of the lanes is so mounted in its supporting frame that its article transporting surface is most effective for biasing the article to a position which will most quickly arrange it in single file alignment in the highest speed lane 13. For this purpose, some of the surfaces are level. This is accomplished by positioning each of the tapered roller's centerlines or axes of rotation forming the article transporting surface at an angle which is identical to the angle formed between this centerline and the roller's surface. This angle can be varied from one application to another, depending upon the amount of transverse movement and acceleration, as distinguished from forward movement, is desired to be transmitted to the articles being transported. In the present application, a taper of about 0.085 inch per axial inch of roller length has been found to produce satisfactory results. Thus, a roller of approximately nineteen and one-fourth inches in length will have a diameter of 1.6 inches at its small end and of 3.3 inches at its large end.

Figure 6A:
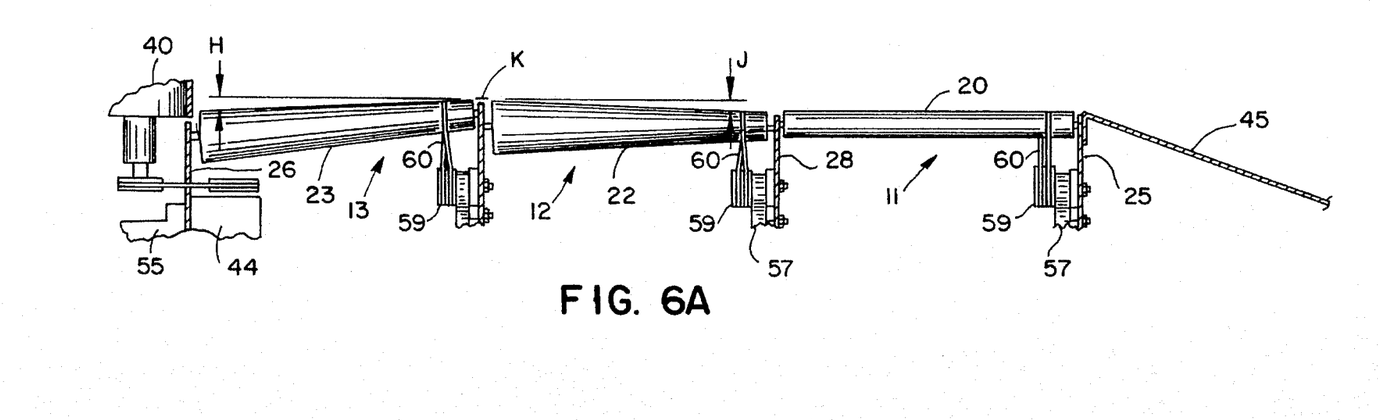
FIG. 6A is a sectional elevation view taken along the same plane as FIG. 2 illustrating a preferred construction for the rollers.

In the preferred construction, the unit is designed to use axleless rollers. The rollers are rigidly attached to the side frame members by short axle adapters. However, these rollers could each be supported by a central shaft, or by a pair of shaft sections, one at each end, aligned along the same axis as the axle adapters would have been. In either construction, the ends of the shaft project from the roller and are supported by one of the unscrambler's frame members 25 or 26 or intermediate frame member 28 (FIG. 6A). In the case of both a single central shaft or a pair of short lengths of shaft, the centerline of the shaft or shaft sections is centered about the centerline of the roller. The frame members 25, 26 or 28, in turn, are mounted on and supported by suitable, rigid frame members 29 (FIG. 2) of suitable strength which frame member construction is well known to the conveyor industry.

As earlier described, the article transport surface of the unscrambler is divided into plural, side-by-side lanes 11, 12 and 13 which extend the entire length of the unit. The number of these lanes depends upon the length and speed of the unscrambler and the volume it is designed to handle. Also the length of the whole unit is a factor since, at any given speed, the efficient capacity of the unscrambler will depend upon its capability of arranging all the articles in a single lane. Because of the length of the unscrambler, the article propelling rollers in each lane are preferably driven at the same speed from one end of the unit to the other. However, the rollers in the slowest lane 11 are driven at a speed less than that of the rollers of the intermediate lane 12 which in turn are driven at a speed less than that of the rollers in lane 13. Thus, as the articles move transversely of the unscrambler's surface, their forward motion is accelerated not only by the forward thrust provided by the rollers on and across which they are being moved, but also by the acceleration provided as they transfer from lane to lane as they also travel lengthwise. This results from the fact that the rollers in adjacent lanes are so arranged that the articles transfer from lanes having slower rollers to lanes having faster, higher speed rollers. Further, when the transfer is between lanes, both of which have tapered rollers, they are discharged from the large end of the slower rollers onto the small end of the higher speed rollers of the next adjacent lane. The receiving lane rollers have a surface speed at the receiving or small diameter end which is equal to or greater than the surface speed of the large end of the rollers from which the articles were discharged.

This provides a linear speed increase across the conveying surface with fastest speeds being achieved proximate belt 40. This characteristic of the surface created by the three parallel and adjacent lanes of driven rollers is important not only to acceleration of the articles, it is also important in effecting article separation lengthwise of the conveyor. This is essential to the equipment's ability to ultimately arrange the articles in single file as they are discharged from the unit. This is particularly true when the unit is used to separate, arrange in tandem, and discharge in single file, a large number of articles of different shapes, sizes and weights. The linear speed increase across the conveying surface further produces a beneficial rotation of packages which further tends to separate the packages. This rotation is a result of different lateral portions of each package traveling at a different speed. This rotation will beneficially be at a different rate for laterally adjacent packages, which, yet further, assists in package separation.

In one embodiment, the rollers 20 in receiving lane 11 are of uniform diameter throughout their length and their central axis is level or horizontal (FIGS. 2 and 6A). Rollers 20 are driven at the least speed. Rollers 22 of the middle or intermediate lane are tapered lengthwise with their least diameter at the article receiving end, that is, adjacent the rollers of lane 11 (FIG. 6A). In this construction, the axes of the rollers 22 of the intermediate or central lane are so inclined as to provide a small transverse upward slope to the article contacting and transport surface, as indicated by the letter J. This inclination is small and, in the preferred construction, will result in the top surface of the large ends of the rollers 22 being in the same plane as the surface of the adjacent small ends of the rollers 23 as indicated by the letters H and J in FIG. 6A.

Rollers 23 in lane 13 are of the same size and construction as rollers 22. The axes of rollers 23 in lane 13 are so inclined that the top surfaces of these rollers will slope downwardly away from the rollers 22 a fraction of an inch, such as about ⅜ of an inch, throughout their length as indicated by the letter H (FIG. 6A). Thus, in this construction, the inclination of the article transporting rollers 22 and 23 is the same amount but the direction of slope of these two lanes of rollers are in opposite directions (letters H and J), forming an apex (K) where the two lanes are adjacent each other. To do this, the rollers 23 are inclined downwardly at a small angle from that which would provide a level surface. The combination of the upward top surface inclination of the rollers in lane 12 and the downward surface inclination of the upper surface of the rollers in lane 13 provides a positive and rapid interruption of contact between the trailing end of an article transferring from the rollers 22 to the rollers 23. Articles moving toward lane 13 will not be affected by the rollers of lane 13 until their center of gravity causes them to tip downwardly onto lane 13, resulting in an edge or a corner making positive contact with the rollers of lane 13. At the same time, this will cause the article to break contact quickly with the rollers of the intermediate lane 22. The articles will then be totally under the influence of the rollers 23 of lane 13. Once under control of the rollers of lane 13, the articles will be moved, further accelerated and caused to find an opening to seat against one of the belts 40. The object of this surface configuration is both to accelerate article separation and effect rapid alignment with the belt 40, ready for discharge from the unscrambler.

Figure 6B:
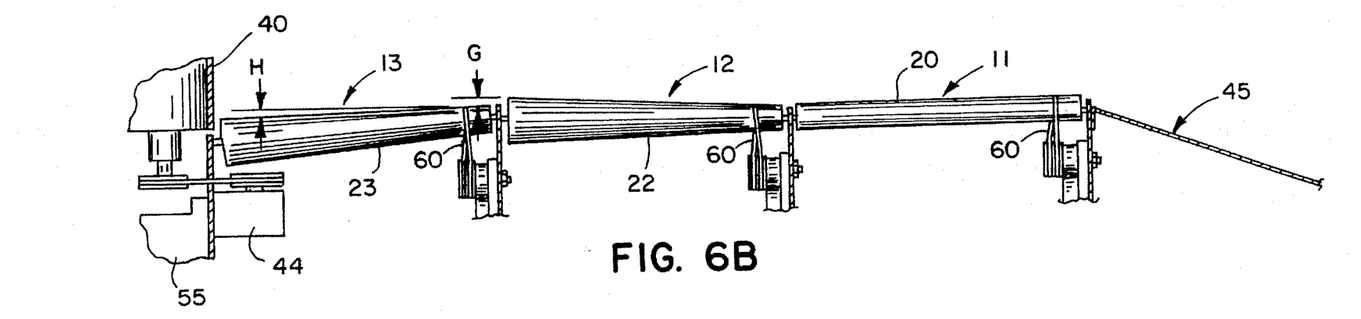
FIG. 6B is a sectional elevation view taken along the same plane as FIG. 6A illustrating a modified construction for the rollers.
Figure 6C:
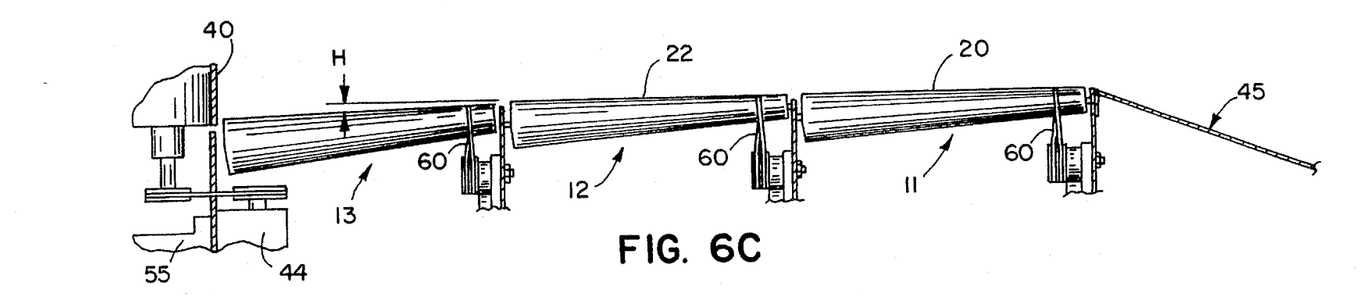
FIG. 6C is a sectional elevation view taken along the same plane as FIG. 6A illustrating a further modified arrangement for the rollers.

FIG. 6B illustrates a modification of the construction just described. In this construction the article contacting surfaces of the rollers in both lanes 11 and 12 are in the same level plane (FIG. 6B). In this case, however, the article contacting surfaces of the rollers 23 in lane 13 are inclined downwardly at the same angle H as the surface of these same rollers 23 in FIG. 6A. In this construction, the adjacent end surfaces of the rollers 23 are located a fraction of an inch, such as about ⅜ of an inch, below the end of the article transport surface of the intermediate lane rollers as indicated at G. This will increase the abrupt transfer of control of the articles effected by the construction illustrated in FIG. 6A. However, if a somewhat less abrupt transfer is desired, the adjacent surface of the roller 23 can be level with the adjacent end of the article transport surface of the intermediate roller 22 (FIG. 6C). In this case, there will remain the downward inclination of the surfaces of the rollers 23 to induce an abrupt contact with the rollers 23 when the center of gravity of the article passes over the end of the rollers 22. The abrupt drop between surfaces of the rollers together with higher speed of the rollers 23 will effect substantial acceleration and separation of the articles. Either construction will facilitate and expedite transfer of articles from the intermediate speed of lane 12 to the higher speed of lane 13.

Figure 6D:
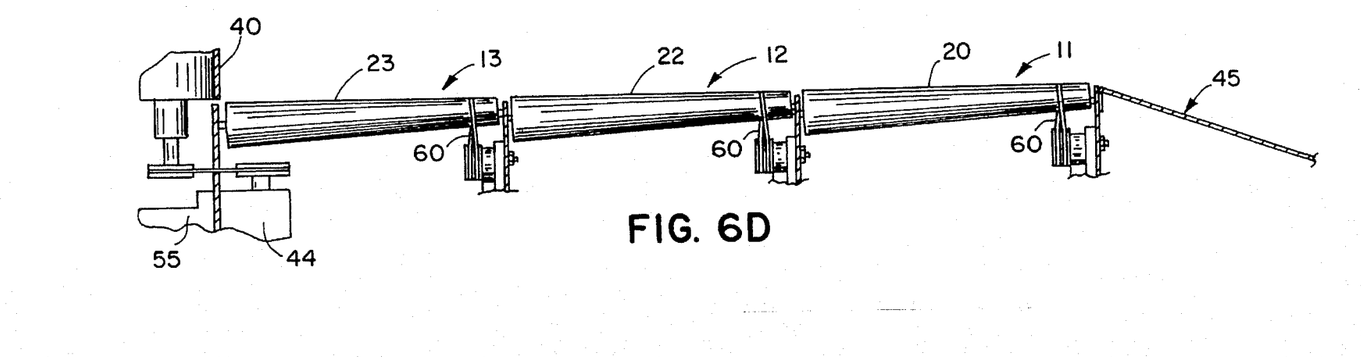
FIG. 6D is a sectional elevation view illustrating a construction in which all the article transport lanes are identical and the surface of the roller in the discharge lane is inclined downwardly.

FIG. 6C also illustrates the fact the unit can be built with tapered rollers in lanes 11 and 12 and retain the conveying surface relationship and change in roller speed between the rollers in lanes 12 and 13 illustrated in FIG. 6B. FIG. 6D illustrates the fact that rollers in all three lanes can be tapered with the axes of the rollers in lane 13 inclined to produce a flat surface across the entire width of the unit.

Adjacent the small end of all of the rollers in all of the lanes a belt channel 27 is formed (FIG. 2). This is provided to seat a belt for driving the roller and avoid contact between the belt and the articles. If the roller is to be driven by other means, this channel or belt groove can be omitted and a different means for driving the roller substituted. The belt and the means of driving it will be explained subsequently.

The significance of several roller combinations which have been described becomes evident when it is viewed in the light of the typical operating speeds demanded of an unscrambler of this construction. Articles are received from an input conveyor means 14 (FIG. 1) having a feed belt wide enough to feed simultaneously all three unscrambler lanes 11, 12 and 13 with an assortment of packages of assorted sizes, shapes and weights at, for example, an input speed of about 500 feet per minute. The speed of the article contacting surface of the rollers 20 in the slowest lane 11 preferably is 320 feet per minute. When the rollers are tapered in lane 11, as illustrated in FIGS. 6C and 6D, the roller surface speed is measured at the large end of the article transporting rollers. In the intermediate lane 12 a preferable surface speed of the article contacting surface of the rollers at their large or discharge ends is 1230 feet per minute, and the surface speed of the article contacting surface of the rollers in the innermost lane 13, at their large or discharge ends, is 1760 feet per minute.

Normally, the article receiving ends of the rollers in each lane have a surface speed equal to that of the rollers from which the articles are received. Further, because of the taper of the rollers in those lanes having such rollers, the surface speed increases as the articles move lengthwise of the rollers. Thus, as the articles move from lane to lane, there is a substantially linear speed increase causing a constant acceleration force applied to the articles to separate them. The inclination or skew of the rollers' axes to the centerline of the conveyor imparts a transversely acting force to the articles, accelerating their movement from the slower lanes to the faster ones. Thus, the articles are rapidly shifted both lengthwise and transversely of the surface of the unscrambler until they engage one of the belts 40 forming the outer edge of the high speed lane 13. These belts 40 are all driven at the same speed, preferably by their respective prime movers 44 that being 1760 feet per minute, which is equal to that of the surface speed at the large end of the rollers of the adjacent lane 13. Contact with these belts has the effect of pivoting the articles, if initial contact occurs at a corner of the article. If this is a downstream corner in the direction of article movement, it will have the effect of pivoting the article to bring the entire side of the article upstream of that corner into contact with one of the adjacent belts 40. If the article's movement is hindered by another article, not in contact with a belt 40, the acceleration delivered to the articles will tend to separate the articles so that alignment with the belts 40 can occur. In this manner, the rollers of the high speed lane complete the alignment of the articles in single file on the high speed side of the unit. In a similar manner, except they do not have the assistance of the belts 40, the rollers in the other lanes will be arranging other articles, drawing gaps between articles, accelerating them, rotating them and positioning them to enter any gap these articles may find in the stream of articles being forwarded in the lane 13.

Figure 7:
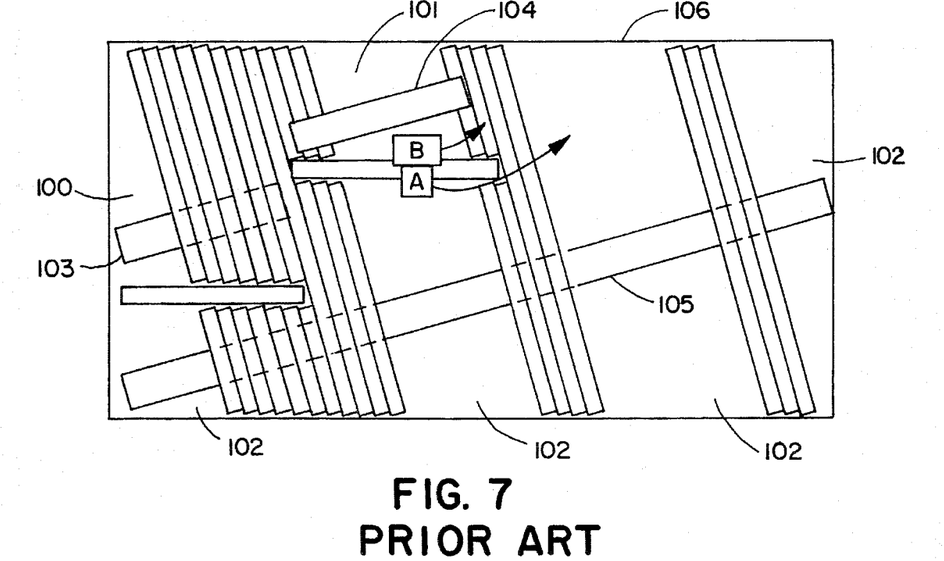
FIG. 7 is a schematic plan view of a prior art conveyor having plural zones of different speeds.
Figure 8:
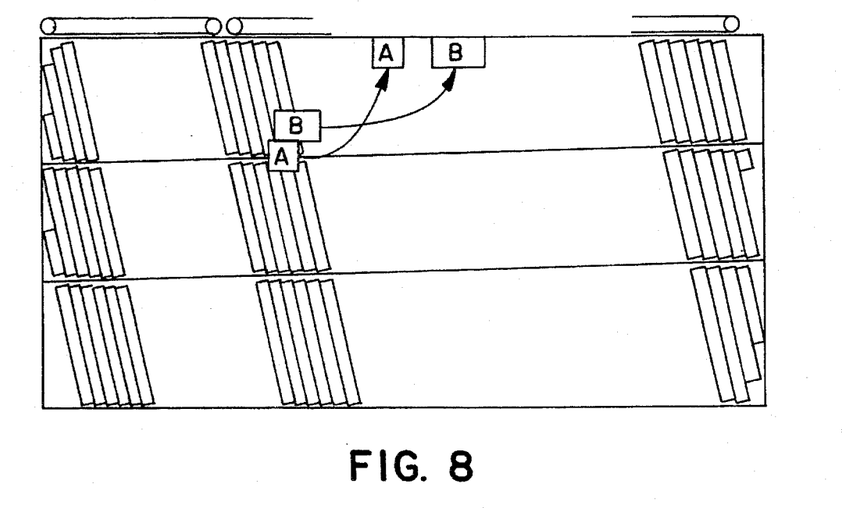
FIG. 8 is a Schematic plan view of an article unscrambler and aligner illustrating the principles of the present invention.

FIGS. 7 and 8 illustrate this operation. Heretofore, conveyors using rollers, the axes of rotation of which were inclined to, rather than normal to, the sides of the conveyor, used rollers arranged in groups 100, 101, 102 which were driven, respectively by belts 103, 104 and 105 to increase in speed lengthwise of the unscrambler in order to position packages against a retarding surface 106 by accelerating packages that are laterally farthest from the discharge portion. This is seen by comparing the movement of package A ahead of package B in FIG. 7. Package A remote from the final alignment and discharge lane will be moved ahead of the B package already in the final discharge lane because the B package will be subject to deceleration by slower zones closer to the retarder. This will cause the A package furthest from the final discharge lane to be moved ahead relative to the B package. Edges of packages reaching the retarder are retarded in order to rotate packages into alignment. In U.S. Pat. No. 4,039,074 issued Aug. 2, 1977, entitled UNSCRAMBLER FOR RANDOMLY ARRANGED PACKAGES, the rollers are arranged in this manner in groups which divide the conveying surfaces into sections extending across the conveyor and arranged in progressive order of speed lengthwise of the conveyor (FIG. 7). A decelerator 106, such as a high friction stationary surface extending the length of the unscrambler, retards edges of packages making contact with it. U.S. Pat. No. 4,284,186 entitled UNSCRAMBLING CONVEYOR, subsequently issued on this type of unscrambler, discloses the same basic conveyor construction, except that distinct inclined separator frames are used instead of a retarder to slow down package edges.

This arrangement of the article transporting rollers disclosed in these patents and illustrated in FIG. 7 contrasts with the roller construction illustrated in FIG. 8, and disclosed in this application, in which the unscrambler's surface provides a linear speed increase laterally toward the package discharge portion. In the FIG. 8 construction, the articles are accelerated by the rollers as they traverse each lane and cross from lane to lane to reach the belts 40 which align them for discharge by advancing, rather than retarding, any edges contacting the belt. Thus, package B that is laterally closest to the final discharge and alignment lane will accelerate ahead of the laterally adjacent package A contacting it, creating a gap for the slower moving package to move into. Edges of packages will be accelerated in order to rotate the packages into alignment. This materially increases the capacity of the unscrambler by more rapid alignment of the packages in the final discharge lane without retarding package movement. Furthermore, the present structure is more effective at separating side-by-side packages because the linear speed increase across the conveyor bed will subject even the smallest of packages to singulating forces.

Under operating conditions of heavy loading or for some other unusual condition, it may occur that not all of the articles will become aligned in single file in lane 13 when they reach the output or discharge end of the unscrambler. The design of this equipment in relation to the volume of articles it is designed to handle is such that such articles should represent a fraction of one percent of the total volume of articles being handled. These few articles will either be handled manually or by some other means. One method of dealing with this problem would be to construct the receiving or take away conveyor 42 with two lanes. In this construction, the take-away conveyor lane aligning with lane 12 would receive the few unaligned articles and transport them to a location along the system where by suitable means they could be conveniently reintroduced into the line of articles which were originally lined up against the belts 40. This prevents these unaligned articles from interfering with those which have already been lined up with the belts 40. Another solution would be to conduct such articles to a holding station from which they could, at a convenient time, be retrieved and reintroduced into the system such as by again passing them over the unscrambler. In any case, the number of such articles will represent only a minute fraction of the total number of articles the unit is handling. In any case, the articles will not disrupt the movement of the articles which are moving in alignment against the belts 40.

Figure 3:
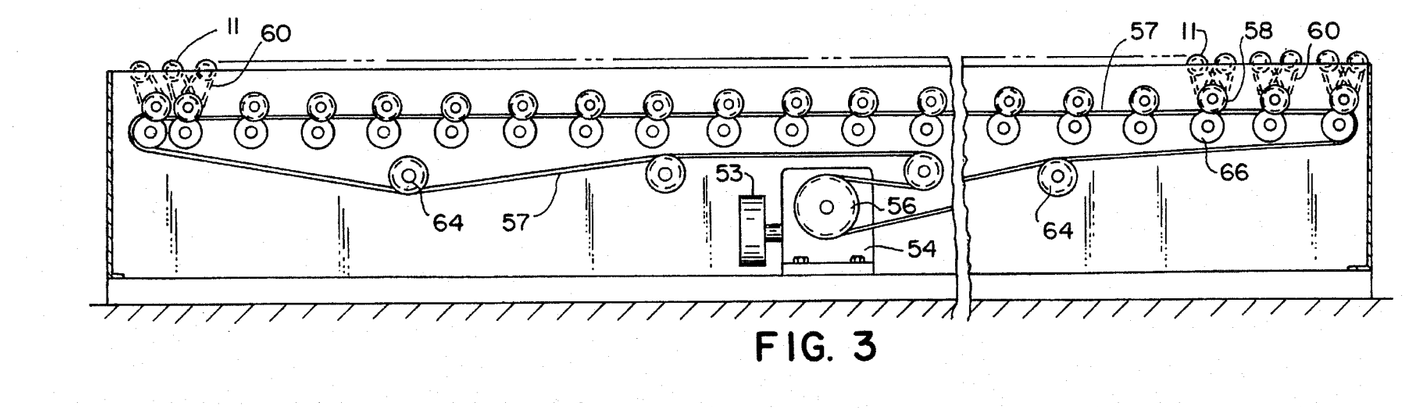
FIG. 3 is an enlarged, sectional elevation view of a typical drive for the conveying rollers in each lane.
Figure 4:
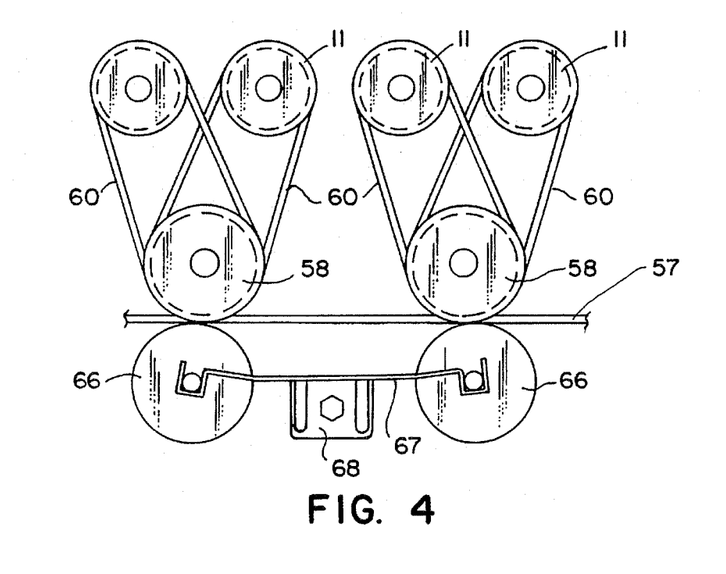
FIG. 4 is an enlarged fragmentary, sectional elevation view of a typical drive for the rollers in any one lane of the unscrambler.
Figure 5:
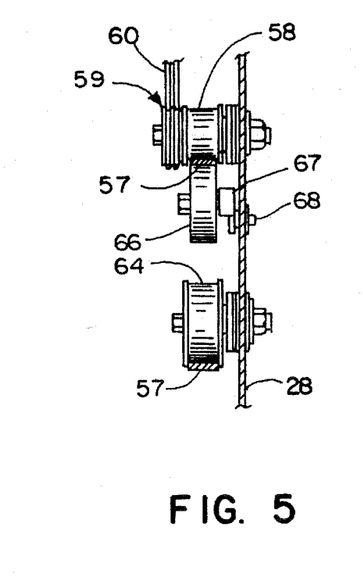
FIG. 5 is an enlarged fragmentary section view of a typical drive for the rollers.

The rollers in each of the lanes 11, 12 and 13 are driven from beneath. Several arrangements can be used for this purpose. FIGS. 1, 2 and 3 illustrate a preferred drive for the rollers. In the preferred construction illustrated in FIGS. 1 and 1A, the article transporting and unscrambling surface is divided into three parallel lanes and each lane thereof is lengthwise divided into five sections B, C, D, E and F, with the rollers in each lane driven at the same speed. While it is considered possible to drive all of the rollers in one lane of the conveyor from a single source, it is considered preferable for service and maintenance, to provide multiple, identical drives. In each of the sections B–F, a single belt 57 drives the rollers in each lane (FIGS. 3, 4 and 5).

FIG. 2 illustrates a typical drive unit for the rollers in each of the sections B, C, D, E and F of the unscrambler. Thus, the arrangement illustrated in FIGS. 2 and 3 is repeated for the rollers in each section of each of the lanes 11, 12 and 13. Since the drive unit in each section is identical, the following description is submitted to be applicable to the drive units for all of the sections B–F. The following description will be limited to the manner in which the rollers are driven.

Each drive unit is powered by a separate source such as the prime mover 52, which conveniently is located beneath the plane of the rollers. It will be recognized that this prime mover could be located on the opposite side of the unscrambler from that shown without affecting this invention. Preferably, each drive unit is located midway between the ends of the section. However, it will be recognized that it could be located toward either end.

The prime mover 52 drives a belt 53. The belt 53 drives the pulleys 61, 62 and 63 of a separate gear box 54 in each of the lanes 11, 12 and 13 for the rollers in each of those lanes. In the construction described, each gear box 54 contains a pair of bevel gears or their equivalent (not illustrated) for driving a belt pulley 56 which, in turn, drives a belt 57. The belt 57 drives a plurality of pulleys 58 (FIGS. 2, 3, 4 and 5) each having a pair of belt channels 59 (FIG. 5). By this means, a single pulley having dual belt channels drives a pair of adjacent article contacting rollers forming the article conveying surface of the unscrambler in that lane by means of belts 60.

Because the rollers in each of the lanes 11, 12 and 13 are driven at different speeds, even though a single motor is used in each of the sections B, C, D, E and F for all lanes, it is necessary at each lane that means be provided for differentiating the actual speed delivered to the article transporting rollers in that lane since the speed of the rollers of each lane is different. This can be accomplished in several ways. A preferred one of which would be use of pulleys of different diameters at each lane. Thus, by using the largest drive pulley 61 for lane 11, an intermediate size pulley 62 for lane 12 and the smallest pulley 63 for lane 13 this speed differential can be accomplished (FIG. 2). The same result could be accomplished by changing the ratios of the gears within each of the boxes 54 driving the output pulleys 61, 62, 63. It also could be accomplished by a combination of these various means. Irrespective of which speed differentiating means is used, the result will be the same so far as the ability of the unit to separate and laterally transfer the articles and to align them in lane 13. In any case, the means by which the rollers in the lanes 11, 12 and 13 are driven is the same in each of the five sections B, C, D, E, and F.

To assure the application of an effective drive force to the rollers in each lane, the tension on the belt 53 can be adjusted by repositioning one or more of the idler or tension pulleys 65 (FIG. 2), to maintain the application of a positive drive to the rollers in each of the lanes. Also because of the demand on these belts when the unit is fully loaded and to keep the several lanes coordinated, the belt 53 may be one having teeth and the pulley 55 which drives it together with the pulleys 61, 62 and 63 it drives may also be so equipped. This arrangement prevents slippage and would assure coordinated operation of all the lanes.

FIG. 3 provides an elevation illustration of the belt arrangement by which all of the article transport rollers in one lane of one section are belt driven by one of the gear boxes 54. This is accomplished by the belt 57 which drives each of the pulleys 58 connected to the dual pulleys portion 59 in the section. At each of the dual pulley locations, the belt 57 is pressed against the pulley 58 by the pressure exerting idler or pressure pulley 66. This arrangement is to reduce the level of reversing stress and fatigue subjected to belt 57. As illustrated in FIG. 4, the pressure pulleys 66 are arranged in pairs with a spring element 67, such as a leaf spring, urging them into positive engagement with the belt 57 beneath each of the pulleys 58. The leaf spring is supported from the adjacent frame 28 of the equipment by suitable means such as the flange 68. Providing effective pressure is important, because it is essential that the motion of the belt 57 be transmitted by the pulley portion 58 to each of the belts 60. Each of the belts 60 drives one of the article propelling rollers above it forming the transport surface of the unscrambler. It should also be noted that pulleys 58 and 66 are cantilevered or connected to frame member 28 at only one end to facilitate quick changes of belts 60. Proper tension is applied to belt 57 by adjustment of one or more of the pulleys 64, the position of which may be moved enough to accomplish this purpose.

It will be recognized that to effectively handle large volumes of articles and particularly articles of widely different sizes and weights packed in boxes of various sizes and shapes such as square or rectangular and of substantially different proportions between length and width presents a major problem which has been beyond the capability of equipment heretofore available. Further, many of the packages and their contents which must be handled by the equipment have only limited capacity to withstand jostling, impact and sudden or abrupt changes in direction. The volume which must be handled is such that the slower equipment which does not address these problems is no longer economically feasible. This invention has overcome these problems by providing high speed, high capacity equipment capable of very high dependability.

Changes and modifications in the specifically described embodiments can be carried out without departing from the principles of the invention. For example, the use of tapered rollers arranged in lanes that are driven at different speeds is to simulate the linear speed increase that would be provided by an individual long tapered roller. Therefore, it would be possible to obtain the linear speed increase by substituting a long tapered roller for the narrower lanes of tapered rollers. However, it would be more difficult to manufacture and support such roller. Such linear speed increase could also be obtained by a series of lanes of short constant-diameter rollers, with each lane driven at a different Speed from adjacent lanes. The short rollers would be in order to keep lane width commensurate with package size. The protection afforded the invention is intended to be limited only by the scope of the appended claims, as interpreted according to the principles of patent law including the Doctrine of Equivalents.

The embodiments of the invention in which an exclusive property or privilege is claimed are defined as follows:

What is claimed is:

1. A conveyor comprising:

a frame;

a multiplicity of rotatable article propelling rollers mounted in said frame generally normal to the direction of article movement, defining an article conveying surface;

a driven endless member extending below said rollers in the direction of article movement;

a plurality of drive pulleys below said rollers;

a plurality of idler pressure pulleys positioned below said drive pulleys opposite said endless member for applying pressure to said endless member in order to press said endless member against said drive pulleys to rotate said drive pulleys; and a plurality of transmission elements each for providing a driving connection between one of said drive pulleys and at least one of said article propelling rollers;

wherein adjacent pairs of said pressure pulleys are supported by opposite ends of a leaf spring, which is attached at a mid portion to said frame.

2. The conveyor described in claim 1 wherein said article propelling rollers tapper in diameter from one end to the opposite end.

3. The conveyor described in claim 2 including an article inlet to said article conveying surface to which articles are delivered in random order and alignment wherein said rollers align said articles in a single file along one lateral side of said conveying surface.

4. A conveyor comprising:

a frame;

a multiplicity of rotatable article propelling rollers mounted in said frame generally normal to the direction of article movement, defining an article conveying surface;

a driven endless member extending below said rollers in the direction of article movement;

a plurality of drive pulleys below said rollers;

a plurality of idler pressure pulleys positioned below said drive pulleys opposite said endless member for applying pressure to said endless member in order to press said endless member against said drive pulleys to rotate said drive pulleys; and a plurality of transmission elements each for providing a driving connection between one of said drive pulleys and at least one of said article propelling rollers, wherein each of said transmission elements is a secondary belt around said drive pulley and said at least one of said article propelling rollers.

5. The conveyor described in claim 4 wherein said drive pulleys are cantilever-mounted to said frame in order to facilitate quick change of said secondary belts.

6. The conveyor described in claim 4 wherein each of said transmission elements includes a pair of said secondary belts around said drive pulley and adjacent one of said article propelling rollers.

7. The conveyor described in claim 4 wherein each of said drive pulleys includes a belt channel defined therein and wherein said secondary belt rides in said belt channel.

8. A conveyor comprising:

a frame;

a multiplicity of rotatable article propelling rollers mounted in said frame generally normal to the direction of article movement, defining an article conveying surface;

a driven endless member extending below said rollers in the direction of article movement;

a plurality of drive pulleys below said rollers;

a plurality of idler pressure pulleys positioned below said drive pulleys opposite said endless member for applying pressure to said endless member in order to press said endless member against said drive pulleys to rotate said drive pulleys; and a plurality of transmission elements each for providing a driving connection between one of said drive pulleys and at least one of said article propelling rollers;

wherein said article conveying surface includes a plurality of side-by-side article conveying lanes and including a said driven endless member beneath the rollers in each of said lanes; and a prime mover having a driving connection to all of said driven endless members, said driving connection including speed differentiating means for driving the rollers in each lane at a different speed.

9. The conveyor in claim 8 wherein said article transporting surface is elongated and has a plurality of identical article transporting sections arranged in tandem, each of said sections having an identical separate prime mover and motion-transmitting means for driving the rollers forming the transporting surface of that section.

10. A conveyor having a frame, a multiplicity of rotatable article propelling rollers mounted in said frame generally normal to the direction of article movement defining an article conveying surface, a drive for said rollers, said drive being beneath said rollers and having a driven belt extending lengthwise of the conveying surface, motion-transmitting elements driven by said driven belt interconnecting said driven belt to the rollers, and support means urging said driven belt into positive driving engagement with each of said motion-transmitting elements, wherein said driven belt is pressed against each of said motion-transmitting elements at one point by said support means, wherein said driven belt is substantially flat in the vicinity of each of said motion-transmitting elements to reduce the level of reversing stress-induced fatigue in said driven belt, wherein said article conveying surface includes a plurality of side-by-side article conveying lanes and including a driven belt beneath the rollers in each of said lanes and a prime mover having a driving connection to all of said driven belts, said driving connection including speed differentiating means for driving the rollers in each lane at a different speed.

11. The conveyor in claim 10 wherein said support means includes a pressure pulley supported by a leaf spring.

12. The conveyor in claim 10 including an article inlet to said article conveying surface to which articles are delivered in random order and alignment wherein said rollers align said articles in a single file along one lateral side of said conveying surface.

13. The conveyor in claim 10 wherein said each of said motion-transmitting elements includes a pulley contacting said driven belt and at least one secondary belt interconnecting said pulley with at least one of said rollers.

14. The conveyor in claim 13 including at least two secondary belts interconnecting said pulley with respective ones of said rollers.

15. The conveyor in claim 14 wherein said support means includes a pressure pulley supported by a leaf spring.

16. A conveyor having a frame, a multiplicity of rotatable article-propelling rollers in said frame generally normal to the direction of article movement defining an article conveying surface, a driven belt beneath said rollers extending lengthwise of the conveying surface, multiple motion-transmitting pulleys spaced along said conveying surface between said belt and said rollers, multiple secondary belts, each interconnecting one of said motion-transmitting pulleys to at least one of said rollers, multiple pressure pulleys below said driven belt, each pressing said driven belt against one of said motion-transmitting pulleys, and multiple leaf springs, each supporting at least one of said pressure pulleys so as to be biased against said driven belt.

17. The conveyor in claim 16 wherein two of said secondary belts connect one of said motion-transmitting pulleys to two respective rollers.

18. The conveyor in claim 16 wherein each of said leaf springs supports two of said pressure pulleys.

* * * * *